(12) United States Patent  
Dreisbach

(10) Patent No.: US 8,174,161 B2
(45) Date of Patent: May 8, 2012

(54) STATOR FOR AN ELECTRIC MOTOR

(75) Inventor: Olaf Dreisbach, Bätterkinden (CH)

(73) Assignee: ETA SA Manufacture Horlogère Suisse, Grenchen (CH)

( * ) Notice: Subject to any disclaimer, the term of this patent is extended or adjusted under 35 U.S.C. 154(b) by 285 days.

(21) Appl. No.: 12/671,787

(22) PCT Filed: Jul. 3, 2008

(86) PCT No.: PCT/EP2008/058603
§ 371 (c)(1),
(2), (4) Date: Feb. 2, 2010

(87) PCT Pub. No.: WO2009/015982
PCT Pub. Date: Feb. 5, 2009

(65) Prior Publication Data
US 2011/0187221 A1    Aug. 4, 2011

(30) Foreign Application Priority Data
Aug. 2, 2007  (EP) .................................... 07113728

(51) Int. Cl.
*H02K 1/06*  (2006.01)
(52) U.S. Cl. ........................ 310/216.009; 310/216.001
(58) Field of Classification Search ........... 310/216.001, 310/216.009, 216.018, 216.019, 216.031, 310/216.032, 49.22, 49.17
See application file for complete search history.

(56) References Cited

U.S. PATENT DOCUMENTS

| 5,619,086 | A  | * | 4/1997 | Steiner ................... 310/216.037 |
| 6,194,797 | B1 |   | 2/2001 | Simon et al. |
| 6,777,852 | B2 | * | 8/2004 | Ishikawa et al. ............. 310/419 |
| 6,841,915 | B1 | * | 1/2005 | Blume et al. ............... 310/254.1 |
| 7,687,965 | B2 | * | 3/2010 | Ionel et al. ............. 310/216.037 |
| 2007/0164617 | A1 | | 7/2007 | Taghezout et al. |

FOREIGN PATENT DOCUMENTS

| DE | 19 42 765 A1 | 3/1971 |
| DE | 197 47 664 A1 | 5/1999 |
| EP | 1 571 749 A | 9/2005 |
| GB | 2 054 978 A | 2/1981 |

OTHER PUBLICATIONS

International Search Report issued in corresponding application No. PCT/EP2008/058603, completed Aug. 7, 2008 and mailed Aug. 27, 2008.

* cited by examiner

*Primary Examiner* — Nguyen N Hanh
(74) *Attorney, Agent, or Firm* — Griffin & Szipl, P.C.

(57)   ABSTRACT

Disclosed is a stator for an electric motor, especially a stepping motor, comprising at least two stator parts (14, 16, 18) which jointly surround a stator hole (12) and are interconnected, connecting sections being provided for connecting the stator parts (14, 16, 18). The stator is characterized in that the connecting sections (13, 15, 17) are tapered relative to the adjacent sections of the adjoining stator parts (14, 16, 18) in an axial direction, parallel to the axis (A) of the stator hole (12), and form isthmi between the adjoining stator parts.

15 Claims, 1 Drawing Sheet

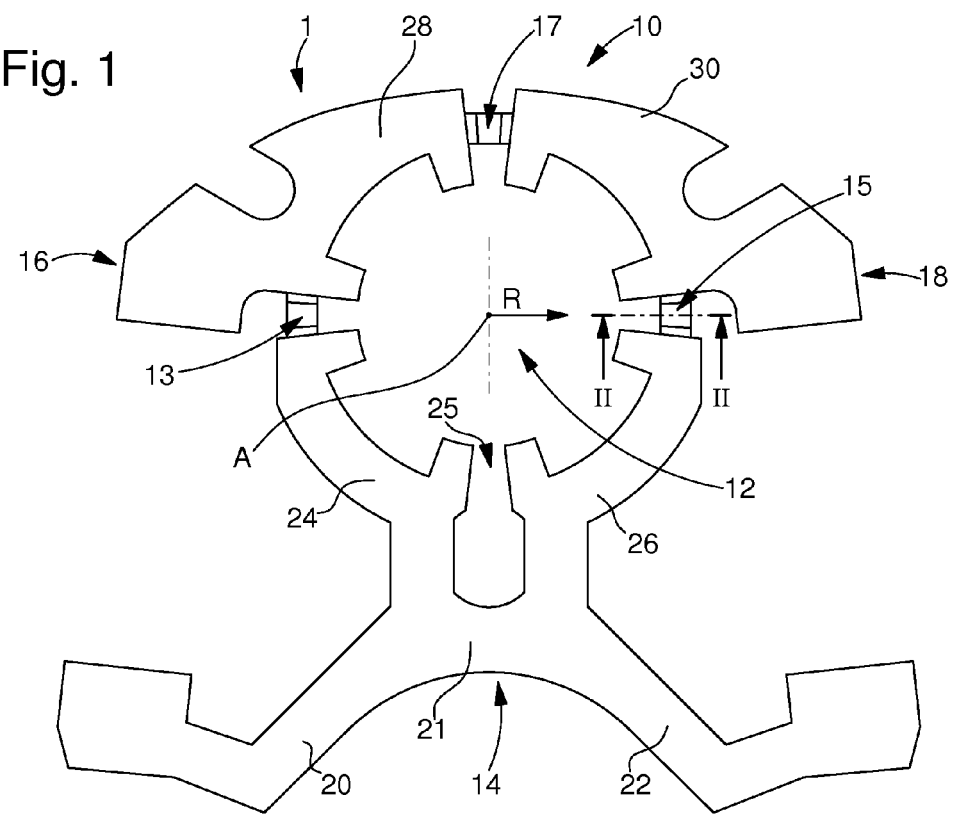
Fig. 1
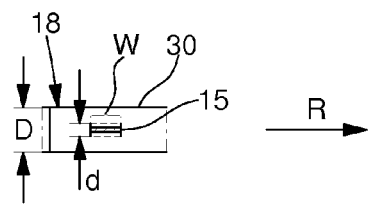
Fig. 2
Fig. 3
(State of the art)

STATOR FOR AN ELECTRIC MOTOR

This is a National Phase Application in the United States of International Patent Application No. PCT/EP2008/058603 filed Jul. 3, 2008, which claims priority on European Patent Application No. 07113728.5, filed Aug. 2, 2007. The entire disclosures of the above patent applications are hereby incorporated by reference.

FIELD OF THE INVENTION

The invention relates to a stator for an electric motor according to the preamble of claim 1. It also relates to a process for the production of the stator as well as an electric motor having this stator.

BACKGROUND OF THE INVENTION

A generic stator is generally known and illustrated in sectional view in FIG. 3. This known stator 100 has three stator parts 104, 106, 108, which surround a stator hole 102 and are connected to one another by means of webs 103, 105, 107. The webs 103, 105, 107 are thin-walled in radial direction R' to the axis A' of the stator hole 102 and have the same thickness in axial direction as the stator parts 104, 106, 108.

The webs 103, 105, 107 form isthmus-like connecting sections between the stator parts 104, 106, 108 and assure a defined alignment of the stator parts relative to one another, thus ensuring that the stator hole 102, in which the rotor runs, is exactly circular.

However, this interconnection of the stator parts 104, 106, 108 provided for mechanical reasons has the disadvantage that the wall thickness W of the webs 103, 105, 107 cannot be decreased as required for technical reasons (in particular because of the processing method), and therefore a residual magnetic flux is transferred between the stator parts 104, 106, 018. In particular, if an electric motor provided with such a stator is configured as a stepping motor, this transfer of the residual magnetic flux between the stator parts can be so high that the efficiency and precision of the stepping motor is impaired.

SUMMARY OF THE INVENTION

It is an object of the invention to propose a generic stator, in which the transfer of the magnetic flux between the stator parts is significantly reduced and which is simple and inexpensive to produce.

This object is achieved by the feature specified in the characterising clause of claim 1.

The reduction of the thickness of the connecting sections in axial direction allows the cross-section of the connecting sections to be reduced using an efficient and technically simple method, in particular by stamping. It is thus possible to produce very thin connecting sections. As a result, the transfer of the magnetic flux between the stator parts is effectively reduced in comparison to previous procedures.

If, in an advantageous further development of the invention, the connecting sections are additionally also decreased in radial direction, the cross-section of the connecting sections is reduced still further and the transfer of the magnetic flux is decreased still further.

Advantageous further developments of the invention are specified in the sub-claims.

The stator is preferably formed from three stator parts, which are connected to one another by a total of three isthmus-like connecting sections.

It is particularly advantageous if the isthmus-like connecting sections are configured in one piece with the stator parts and thus form an integral stator body of the stator. This one-piece configuration of the stator reduces the production costs significantly.

A process for the production of a stator according to the invention is distinguished by the steps:

a) providing a stator sheet;

b) generating the contour of the stator body (10) including the connecting sections (13, 15, 17) connecting individual stator parts (14, 16, 18) to one another, wherein the thickness of the connecting sections (13, 15, 17) is reduced in axial direction in order to generate isthmuses between the adjoining stator parts.

This process according to the invention is suitable for producing a large unit number of stators according to the invention in a particularly economical manner in a short period and inexpensively. It should be noted in this case that the electric motors equipped with these stators are products of a mass-production of several hundreds of thousands of units per day.

Step b) is advantageously divided into three component steps:

b1) making holes in the stator sheet at locations that determine the radial boundaries of the connecting sections;

b2) reducing the thickness of the stator sheet at the location of the connecting sections (13, 15, 17) in axial direction in order to generate the isthmuses between the adjoining stator parts; and b3) releasing the contour of the stator body (10) including the connecting sections (13, 15, 17) connecting the individual stator parts (14, 16, 18) to one another by working without cutting.

It is particularly advantageous in this case, if the step of releasing the contour of the stator body is performed by stamping or cutting out of the provided stator sheet using a high-energy beam, for example.

The step of reducing the thickness of the isthmus-like connecting pieces in axial direction is preferably performed by material forming, in particular by stamping. The material forming additionally has a positive effect on the increase of the magnetic resistance in this region.

Such a material forming step can be performed, for example, while the contour of the stator is being stamped out, and as a result of this the stator can be produced in one work cycle.

A preferred application of the stator according to the invention occurs in an electric motor with such a stator, a motor housing accommodating the stator and a rotor inserted into the stator hole and rotatably mounted in the motor housing.

The stator in such an electric motor is, of course, provided with electrical windings in a conventional manner that are attached to the respective stator sections.

BRIEF DESCRIPTION OF THE DRAWINGS

The invention is explained in more detail below on the basis of an example with reference to the drawing:

FIG. 1 is a top view of a stator according to the invention;

FIG. 2 is a sectional view in radial direction through a connecting section taken along line II-II in FIG. 1; and FIG. 3 shows a stator according to the prior art.

DETAILED DESCRIPTION OF THE ILLUSTRATIVE EMBODIMENTS

FIG. 1 shows the body 10 of a stator 1 in top view. For better understanding of the invention, the electrical windings of the stator are not shown. The stator body is produced from a stator sheet composed of an alloy of iron and silicon (FeSi) or an alloy or iron and nickel (FeNi).

The stator body 10 has a stator hole 12, which is configured to receive a rotor (not shown) so that the rotor and stator together form an electric motor with a motor housing (not shown).

The stator body 10 comprises three stator parts 14, 16, 18 that surround the stator hole 12. The lower stator part 14 has two arms 20, 22, which extend downwards on an angle and are connected to one another in the central region by means of a central section 21. A first coil receiving section 24 curved in a circular arc shape is provided that lies inside a first quadrant of the circular stator hole 12. A second coil receiving section 26 curved in a circular arc shape that lies inside a second quadrant of the circular stator hole 12 is provided on the second arm 22 in the region of the central section 21.

A first connecting section 13 or a second connecting section 15 extends from the respective upper free end of the first or second coil receiving section 24, 26 to a second stator part 16 or third stator part 18 located above the first stator part 14. The second stator part 16 and the third stator part 18 are connected to one another at their respective free end via a third connecting section 17.

Both the second stator part 16 and the third stator part 18 have a respective coil receiving section 28 or 30, and these are respectively located in a third or fourth quadrant of the stator hole 12. In this way, the first coil receiving section 24 and the second coil receiving section 26 of the first stator part 14 together with the third coil receiving section 28 provided on the second stator part 16 and the fourth coil receiving section 30 provided on the third stator part 18 surround the stator hole 12.

While the two coil receiving sections 24 and 26 of the first stator part are spaced from one another around the axis A of the stator hole 12 in the peripheral direction and form a space 25 between them, there is indeed also a respective space configured in the peripheral direction between the first coil receiving section 24 and the third coil receiving section 28 and also between the second coil receiving section 26 and the fourth coil receiving section 30 and between the third coil receiving section 28 and the fourth coil receiving section 30, and said respective space is bridged by the connecting sections 13, 15 and 17 respectively. In order to interrupt the magnetic flux between the respective coil receiving sections in the peripheral direction in the desired manner, the connecting sections 13, 15, 17 are narrower in radial direction R than the respectively adjacent coil receiving sections 24, 26, 28, 30.

Moreover, the connecting sections 13, 15, 17 are also thinner in the direction of axis A than the respectively adjacent coil receiving sections 24, 26, 28, 30. It is clearly visible in FIG. 2 that the wall thickness W of the connecting section 15 is substantially smaller in the radial direction R than the radial extent of the respective coil receiving section in this region. It is additionally evident from FIG. 2 that the thickness d (e.g. 0.1 mm) of the connecting section 17 is in the range of 5-times to 20-times smaller than the thickness D (e.g. 1 mm) of the adjacent coil receiving section 30. While only connecting section 17 is shown in FIG. 2, the connecting sections 13 and 15 are configured in the same manner.

The invention is not restricted to the above exemplary embodiment that merely serves for general explanation of the core concept of the invention. Rather, within the scope of protection the device according to the invention can also assume configurations other than those described above. In this case, the device can have features in particular that represent a combination of the respective individual features of the claims.

The reference numerals in the claims, description and drawings are merely for better understanding of the invention and should not restrict the scope of protection.

The invention claimed is:

1. A stator for an electric motor, in particular for a stepping motor, with at least two stator parts, which jointly surround a stator hole, wherein the individual stator parts are connected to one another, wherein connecting sections are provided for connection of the stator parts, wherein the connecting sections are tapered in axial direction parallel to the axis of the stator hole relative to the adjacent sections of the adjoining stator parts and form isthmuses between the adjoining stator parts.

2. The stator according to claim 1, wherein the isthmus-like connecting sections are also tapered in radial direction to the axis of the stator hole relative to the adjacent sections of the adjoining stator parts.

3. The stator according to claim 2, wherein the stator has three stator parts, which are connected to one another via a total of three isthmus-like connecting sections.

4. The stator according to claim 3, wherein the isthmus-like connecting sections are configured in one piece with the stator parts and thus form an integral stator body of the stator.

5. A process for the production of a stator with the features of claim 4, characterized by the steps:
    a) providing a stator sheet;
    b) generating the contour of the stator body including the connecting sections connecting individual stator parts to one another, wherein the thickness of the connecting sections is reduced in axial direction in order to generate isthmuses between the adjoining stator parts.

6. The electric motor with a stator according to claim 4, a motor housing accommodating the stator and a rotor inserted into the stator hole and rotatably mounted in the motor housing.

7. A process for the production of a stator with the features of claim 3, characterized by the steps:
    a) providing a stator sheet;
    b) generating the contour of the stator body including the connecting sections connecting individual stator parts to one another, wherein the thickness of the connecting sections is reduced in axial direction in order to generate isthmuses between the adjoining stator parts.

8. The electric motor with a stator according to claim 3, a motor housing accommodating the stator and a rotor inserted into the stator hole and rotatably mounted in the motor housing.

9. A process for the production of a stator with the features of claim 2, characterised by the steps:
    a) providing a stator sheet;
    b) generating the contour of the stator body including the connecting sections connecting individual stator parts to one another, wherein the thickness of the connecting sections is reduced in axial direction in order to generate isthmuses between the adjoining stator parts.

10. The electric motor with a stator according to claim 2, a motor housing accommodating the stator and a rotor inserted into the stator hole and rotatably mounted in the motor housing.

11. The electric motor with a stator according to claim 1, a motor housing accommodating the stator and a rotor inserted into the stator hole and rotatably mounted in the motor housing.

12. A process for the production of a stator with the features of claim 1, characterized by the steps:
    a) providing a stator sheet;
    b) generating the contour of the stator body including the connecting sections connecting individual stator parts to one another, wherein the thickness of the connecting sections is reduced in axial direction in order to generate isthmuses between the adjoining stator parts.

13. The process according to claim 12, wherein step b) for generating the contour of the stator body is divided into the following component steps:
    b1) making holes in the stator sheet at locations that determine the radial boundaries of the connecting sections;

b2) reducing the thickness of the stator sheet at the location of the connecting sections in axial direction in order to generate the isthmuses between the adjoining stator parts; and b3) releasing the contour of the stator body including the connecting sections connecting the individual stator parts to one another by working without cutting.

14. The process according to claim 13, wherein step b2) for reducing the thickness of the connecting sections in axial direction is performed by material forming, in particular by stamping.

15. The process according to claim 13, wherein step b3) for releasing the contour of the stator body is performed by stamping it out of the stator sheet provided in step a).

* * * * *